(12) United States Patent
Arnau Villanova

(10) Patent No.: US 9,387,480 B2
(45) Date of Patent: Jul. 12, 2016

(54) GRANULATION BY AGGLOMERATION OF CERAMIC COMPOSITIONS GROUND IN DRY PHASE

(76) Inventor: Antonio Arnau Villanova, Onda (ES)

( * ) Notice: Subject to any disclaimer, the term of this patent is extended or adjusted under 35 U.S.C. 154(b) by 565 days.

(21) Appl. No.: 13/881,549

(22) PCT Filed: Oct. 25, 2011

(86) PCT No.: PCT/ES2011/070738
§ 371 (c)(1),
(2), (4) Date: Jun. 13, 2013

(87) PCT Pub. No.: WO2012/056077
PCT Pub. Date: May 3, 2012

(65) Prior Publication Data
US 2013/0248625 A1    Sep. 26, 2013

(30) Foreign Application Priority Data

Oct. 26, 2010 (ES) .................................. 201001374

(51) Int. Cl.
*B02C 17/18* (2006.01)
*B01J 2/10* (2006.01)
*C04B 33/04* (2006.01)
(Continued)

(52) U.S. Cl.
CPC . *B02C 17/18* (2013.01); *B01J 2/10* (2013.01); *C04B 33/04* (2013.01); *C04B 33/131* (2013.01); *C04B 35/62695* (2013.01); *C04B 2235/3201* (2013.01); *C04B 2235/3206* (2013.01); *C04B 2235/3208* (2013.01); *C04B 2235/3215* (2013.01); *C04B 2235/3232* (2013.01); *C04B 2235/3244* (2013.01); *C04B 2235/3272* (2013.01); *C04B 2235/3418* (2013.01); *C04B 2235/3472* (2013.01); *C04B 2235/42* (2013.01); *C04B 2235/5436* (2013.01); *C04B 2235/5445* (2013.01); *C04B 2235/72* (2013.01);
(Continued)

(58) Field of Classification Search
USPC ................................................. 241/21, 30, 25
See application file for complete search history.

(56) References Cited

U.S. PATENT DOCUMENTS 4,108,932 A * 8/1978 Takewell ..................... B01J 2/12
264/117

FOREIGN PATENT DOCUMENTS

EP          0699640       * 3/1996

*Primary Examiner* — Mark Rosenbaum
(74) *Attorney, Agent, or Firm* — Sughrue Mion, PLLC

(57) ABSTRACT

The invention relates to the granulation by agglomeration of ceramic compositions ground in dry phase. The invention proposes an alternative to the method of wet-phase grinding and drying by atomization. The method consists of dry-phase grinding and preparing argillaceous ceramic compositions without binders, additives, or deflocculants from argillaceous minerals (about 60%) mixed with inorganic materials, grain sizes of less than 120 micrometers, in a horizontal rotary cylindrical device with deflecting paddles, the intake of said minerals, powdery materials and water takes place at one end of said device; and granules that are moved by said deflecting paddles are formed due to the rotation of said device. The outlet of the granulated material is at the opposite end of said device. The invention offers the following advantages: energy savings of 80%; savings in water consumption during granulation of 75-80% and 10-20% of additional savings in the pressure for pressing the granules. The time necessary to change from one ceramic composition to another is one hour, compared with several days using the current method of atomization. The method of granulation constitutes a novel environmental technology with zero air and water table pollution, and with much lower water consumption.

14 Claims, 6 Drawing Sheets

(51) Int. Cl.
*C04B 33/13* (2006.01)
*C04B 35/626* (2006.01)

(52) U.S. Cl.
CPC ..... *C04B2235/725* (2013.01); *C04B 2235/726* (2013.01); *C04B 2235/727* (2013.01)

FIGURE 5.1
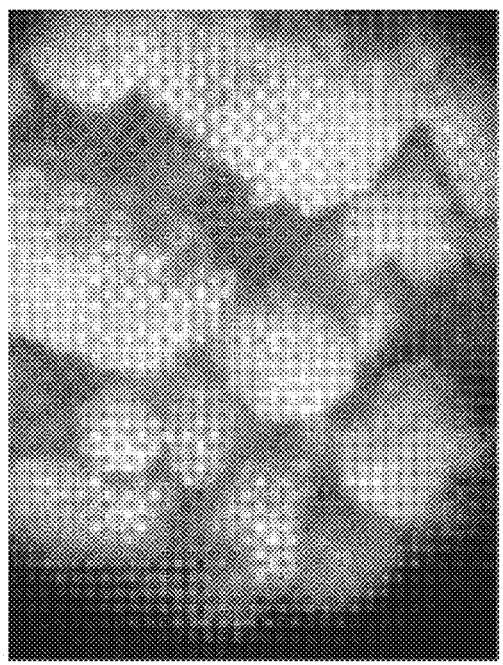
FIGURE 5.2

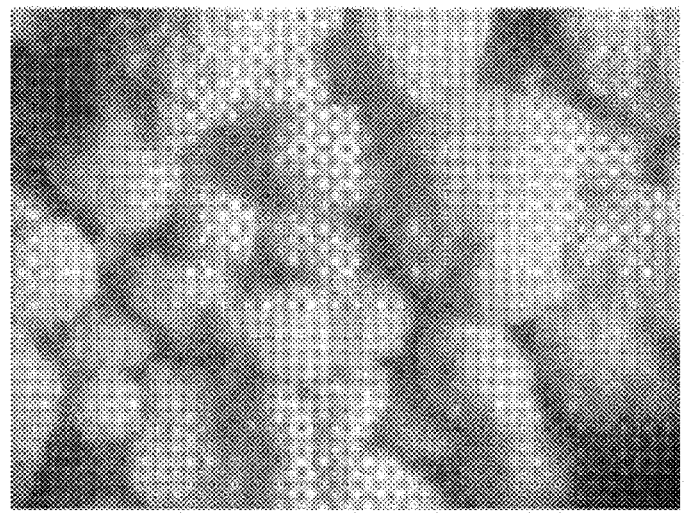
FIGURE 6.1
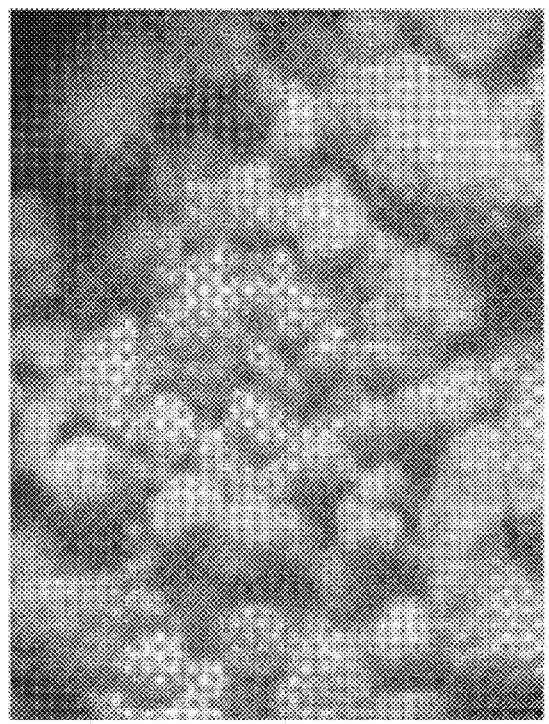
FIGURE 6.2

GRANULATION BY AGGLOMERATION OF CERAMIC COMPOSITIONS GROUND IN DRY PHASE

CROSS REFERENCE TO RELATED APPLICATIONS

This application is a National Stage of International Application No. PCT/ES2011/070738 filed Oct. 25, 2011, claiming priority based on Spanish Patent Application No. P201001374, filed Oct. 26, 2010, the contents of all of which are incorporated herein by reference in their entirety.

BACKGROUND OF THE INVENTION

The present invention relates to the manufacture of fine ceramics such as coverings, earthenware, porcelains, sanitary ceramics and sanitary ware, in which a composition of raw materials made up of clays and other minerals is used. The invention particularly relates to the granulation by agglomeration of compositions forming the ceramic raw materials obtained through dry-phase grinding.

OBJECT OF THE INVENTION

The object of the invention is to propose a method of mixing-granulating materials ground in dry phase for replacing the method of wet-phase grinding and subsequent drying by atomization used today, wherein the dry phase method prevents the technological drawbacks caused by the wet phase.

STATE OF THE ART

Agglomeration is a general term defining the increase in grain size due to mechanical forces, i.e., it covers the methods of agglomerating and binding highly dispersed particles into larger aggregates. In fact, the term agglomeration is the technological opposite of disaggregating or fragmenting. In the art, aggregates can include, among others, pellets, extrudates, granulates, tablets, etc., which is a particular designation resulting from the technological method used in obtaining particle agglomerates; a classification which distinguishes the agglomeration of mini particles themselves, agglomeration by pressure, by atomization and drying, and formation without using pressure. Cohesive forces are required for forming larger stable aggregates from primary particles. These forces are chemical and physical forces. These forces can be provided by the particles themselves or by co-adjuvants such as binders or adhesives.

Two alternative ways for granulating a ceramic composition, which are the result of the chosen initial grinding, can be highlighted in the production method:

a) the wet phase method used today with different technological drawbacks, and b) the dry phase method not extensively used today.

A crucial point for a method of producing ceramic materials is the selection of available raw materials that must form part of the composition, fundamentally clays and feldspars, sand, carbonates and kaolins. The raw material contains mostly different clays and other minerals such as feldspars, silica sand, calcium carbonate, etc., according to the compositions to be produced. The clays represent the field of soft materials and the others represent the field of hard materials.

For economic reasons, the raw materials are generally used as mined or after subjecting them to minimum treatment such as washing. As a rule, their natural origin requires a prior homogenization assuring the uniformity of their characteristics, which can be guaranteed by the mining company itself or by the ceramic material producer.

The first step usually consists of mixing the different components of the ceramic paste, subsequently subjecting same to a grinding method which can generally be in wet phase, or in dry phase such as the object of the present invention. In the latter, mixing can optionally be performed during grinding, or even during granulation itself.

In separate grinding, it is necessary to subsequently mix the different components for forming the given ceramic formula. The composition has a very small particle size (less than 120 micrometers) and the behavior thereof is highly fluid like a liquid; such fine powder makes the suitable handling thereof impossible. Subsequently, the fluidity necessary for filling the molds for any type presses must also be necessarily lower. The final composition of the mixture is highly variable depending on the end ceramic product to be manufactured.

It is necessary to highlight that the material resulting from grinding has very different characteristics depending on whether it is ground in dry phase or in wet phase. Fragmentation occurs in the first case, both the aggregates and the particle agglomerates being maintained, the resulting particle size being greater (some more than 300 micrometers) than that obtained in wet phase (all less than 200 micrometers).

The method used today in manufacturing ceramic floorings and coverings is the wet phase method. In the wet phase method, raw materials are ground in a liquid phase in the ball mill, producing the suspension of materials finely suspended in water. As a result, it is necessary to remove this water from the resulting suspension (referred to as slip) until obtaining the moisture content necessary for the subsequent method. For drying, the most widely used method in manufacturing ceramic products is drying by atomization. Before the method of atomization, all the composition ground in wet-phase has been mixed inside continuous or discontinuous ball mills where the minerals forming the composition are ground and mixed at the same time. This composition is ground with a moisture content of 30% to 40%, i.e., using excess water. A composition is thus generated with a density of 1.30 to 1.40 Kg/l which is then sieved to be unloaded in large reservoirs, and the composition is kept in motion with the aid of stirrers and additives preventing sedimentation. Each of these reservoirs can contain more than 100,000 liters, therefore it is necessary to mix several grindings.

The method of atomization is a method whereby the suspension is sprayed in the form of droplets which come into contact with hot air, and a solid with low moisture content is obtained as a product. To remove the water, pressurized streams of the composition are introduced by way of an upward shower, and hot air at about 650° C. is introduced by way of a downward countercurrent. The granules of the solid composition with a moisture content of 5 or 6% fall to the bottom of the atomizer. The atomizer is a large, metal cone-shaped device made of stainless steel, generally 15 m in height by 6 m in diameter, according to the desired production. The production thereof is measured by liters of water evaporated and by the amount of solid product at the outlet thereof in tons per hour. The fuel for generating hot air is generally natural gas since it provides less polluting hot fumes. The granules produced in the atomizer are uniform in terms of their spheroidal shape and an average grain size ranging in the values suitable for feeding the ceramic composition to the step of manufacturing compressed products in presses.

Among the many documents mentioning the use of atomization for granulating at normal pressure, the following can be mentioned:

Document CN101011843 of WANG JIAZHU relates to the combined use of various materials, including talc, clays, for artificial walls imitating stone. The mineral components are milled, dry mixed, the colorant is added, the components are formed and calcined at high temperatures. Additionally, the method of atomization is used for forming the compositions.

Patent CN101234888 of HAIRONG LIN also relates to the use of clays for imitating natural stone in glazed tiles and flooring tiles. The invention uses 10-15% of low temperature porcelain stone powder, 10-20% of medium temperature porcelain stone powder, 10-15% of sodium stone sand, 5-10% of porcelain sand with a high aluminum content, 10-20% of sodium porcelain sand, 5-18% of ball-milled clay, condensing agent and pigment. The method has the following steps:
weighing to proportions, passing through the ball mill, coloring, granulating and drying by atomization.

Patent GB1315553 claiming, among others, the production of a catalyst with a high clay content mixed with amorphous and crystalline aluminosilicates, is of certain interest. Even though the method of granulation is fundamentally based on drying by atomization, the invention briefly mentions granulation in a conventional mixer without going into details.

However, the method of agglomeration by atomization has known drawbacks:

The atomizer uses 30%-40% of water on the working mass, which entails an additional energy cost for evaporating the excess water. Additives are necessary to obtain an agglomeration with mechanical strength in accordance with the physical stresses of manipulation of the particles during the successive steps of producing the finished ceramic product.

The environment is significantly affected by this polluted water because it causes:

a) water table pollution;
b) the atomizer also entrains the different binders, additives, deflocculants with the air; and furthermore
c) air pollution due to entrained fine mineral particles, even the transformants thereof since high temperatures of the order of 650° C. sufficient for transforming crystalline phases are reached.

The response time to change from the manufacture of a composition to the manufacture corresponding to another ceramic product is very long (high system inertia); so either more reservoirs and mills are constructed in the atomizer, or this response is very slow, a matter of days.

The investment made in the installation of the devices is significantly high.

The important plasticity property of the composition is lost to a large extent in the atomizer since it is diluted in an excessive amount of water, so a greater force is needed at the time of pressing the ceramic product than in the case of the compositions obtained by the dry phase method.

The method not extensively used today for granulation is the agglomeration of the composition ground in dry phase and the formation of granules by adding small amounts of water enough for maintaining the plastic and cohesion properties inherent to many clays before the compression in molds to give the shape of the desired product.

Patents by Gibb, James L., U.S. Pat. Nos. 4,944,905 and 4,680,230, relating to a method for obtaining ceramic granules for a propping agent with an aluminum rich region near the surface thereof are of special interest due to their approach to ceramic material production, but with a composition not based on clays; the patents have the following steps:

a) mixing and pelletizing with the aid of water, wherein the starting material includes a mineral particulate such as nepheline, syenite and a binder, where among many binders, bentonite is proposed in amounts of only 1-5% of the composition;
b) drying;
c) mixing with alumina;
d) finally calcining.

The patents indicate the use of different types of mixers such as conventional mixers of the mining industry, the disc type sphere agglomerators; among others, the most efficient agglomerators are the devices described in U.S. Pat. No. 3,690,622 basically comprising a rotary cylindrical container, the central axis of which is arranged at an angle with the horizontal, provided with one or more plates and at least one impact crushing tool located below the apex of the path of rotation of the rotary container. Nevertheless, the characteristics of the prepared materials are very unlike the composition used in the fine ceramic industry.

Therefore, there is a need for a method which eliminates the drawbacks of the method of atomization and is oriented on granulation for subsequent pressing in the steps of obtaining different fine ceramic products, in which:

the amount of water strictly necessary for agglomerating the particles and considerably less than that used in the method of atomization is used.

the agglomeration is performed without using binders, additives, deflocculants, etc.

losses due to volatilization of fines when granulating the powder are prevented.

the method is a method employing novel technology with zero air and water table pollution, with a very significant reduction in water and energy consumption.

DESCRIPTION OF THE INVENTION

An alternative to the method of wet-phase grinding and subsequent drying by atomization is proposed. The method of granulation by agglomeration after the dry-phase grinding of the present invention consists of the following steps:

Gathering raw materials

Mixing the materials for obtaining the ceramic composition.

Dry-phase grinding.

Granulating-obtaining the suitable particle morphology.

Adjusting grain moisture content by low temperature drying.

Classifying granules by sieving.

Subsequent storing or processing.

Gathering Raw Materials

The feed composition for the method of granulation after the wet-phase grinding generally consists of an illite clay content, a kaolinite clay content and/or a fireclay content of the order of 60%. Other minerals are different types of feldspars of the flux type:

soda feldspars, potash feldspars, lithium feldspars, and carbonates, calcium carbonate, magnesium carbonate. Additionally, silica sand, pegmatite, magnetite, and others are present in a total content not greater than 40%. In most case, these elements come from mines or are the product of a prior treatment such as washing, for example, in the case of sand.

Mixing Materials for Obtaining the Ceramic Composition

The components of the composition for each ceramic product in question can be mixed in several manners:

Mixing the components before grinding.

Mixing the components during grinding.

Mixing the components during granulation.

In each case, the components are mixed depending on the type of raw material, the state in which it is mined from the mineral deposit, and even on the type of desired ceramic composition.

Dry-Phase Grinding

The step of preparing the materials consists of the dry-phase grinding of the elements which will form the ceramic composition. For this, the elements of the composition or the final composition with all its components already aggregated, can be ground separately. After mixing the selected components of the composition, it enters the dry-phase grinding method. The mills used are of the type existing in the state of the art, such as hammer or pendulum mills. During grinding, the particles of the materials are fragmented and the particle size is taken to less than 120 micrometers.

In the case of separate grinding, the particles are subsequently mixed forming the formula. Said composition will finally have a very small particle size also less than 120 micrometers. The behavior of said powder is similar to that of fluids; part of the mass is formed by such thin powder which is capable of floating and expanding partially in the air upon manipulation, increasing local pollution. As a result, due to this high fluidity the fundamental part of the mass makes it impossible to suitably manipulate it and fill it into molds for any type of presses.

Granulation by Agglomeration of the Particles

The possibility of agglomerating the particles ground in dry phase, obtaining the suitable grain size distribution for the subsequent processing of the ceramic composition as a result of a suitable adjustment of the necessary minimum moisture content and of the configuration of the device used was a surprising result.

After dry-phase grinding, the composition in the form of fine powder enters a device for mixing-granulation by agglomeration where an amount-hour$^{-1}$ corresponding to the formula of the desired ceramic product, and with an added amount of water determined for said specific composition, which only corresponds to the absorption by saturation, is fed. A granulate having the particle morphology and mechanical strength suitable for subsequent transport and manipulation in mold filling is thus formed at the outlet from the powder entering the device.

The device for continuous granulation is a horizontally arranged rotary cylindrical device provided with bars having ends in the form of paddles, in a generally rectangular form of contact, which move the mass of the mixture of minerals ground with water along the entire length thereof from a first side end to the opposite second side end during the rotation of the device. The mixture of minerals and water are metered into said cylindrical device through the upper part of said first side end, and the already granulated material is extracted through the lower part of said opposite second side end. Said bars having ends in the form of paddles are assembled at specific angles, about 90°, and aid the granulation of the composition playing a significant role therein.

The device has undergone specific modifications for granulating such compositions, fundamentally in the coating of its internal frame and of its inner parts with a harder and more wear-resistant material, reinforcing all the elements which will be in contact with the composition to be granulated. The inner coating of the device and the coating of its inner tools is generally a tungsten coating, applied in the form of powder by welding.

The material enters the device at room temperature. The method occurs without external heating and only logical temperature variations occur as a result of the hydration of the clays and the friction with the coating of the inner parts of the granulation device. The granulation occurs at temperatures between 40-80° C. The moisture content of the composition in the intake of the granulation device is of the order of 0.5 to 2.5%. The product is entirely micronized and would lose its binding property with a higher moisture content and stick together. The granulate at the outlet has a moisture content of the order of 10 to 14% and its size ranges from fine granulates (less than 0.100) and granules of 1.0 mm. Work is performed in this range, introducing the smallest possible amount of water for granulation. The temperature in the outlet is of the order of 40-50° C. It must be taken into account that by following the method, the moisture content of the granulate must decrease from 12-14% to 6% of water and with a minimal energy expenditure.

The rotational speed of the device is in the range of 500-3000 rpm. The speed depends on the mass/hour feeding of material to be processed and accordingly on the size of the device. The speed must be adjusted to the composition and the amount to be processed; it will be greater if the device is smaller.

The technique of granulation of very fine heterogeneous solids in dry phase, with average particle sizes of less than 200 micrometers, is difficult without using additives, deflocculants, etc. Organic binders such as resins, starches or carboxy methyl cellulose derivatives, or inorganic binders such as silica gel, silicates, carbonates, and others, are commonly used.

The present invention has developed an innovative method for horizontal mixing type devices provided with bars having ends in the form of paddles, in which the influence of different factors which can lead to an effective granulation, i.e., to the formation of granules which, after drying, have sufficient mechanical properties for the subsequent operations of obtaining ceramic products, has been studied. Among the studied variables are the water content to achieve granulation, the types of desired mineral compositions, residence times in the rotary cylindrical device. Therefore, the optimal addition of water for each specific type of desired composition and, no less important, optimal rotational speed, and the rate of feeding the mixture (equivalent to its residence times), have been determined also depending on the type of ceramic composition. Therefore, granules of the envisaged compositions having the suitable size, with sufficient mechanical strength for subsequent manipulations and with lower moisture content before the operation of drying can be obtained without using binders, additives, deflocculants, etc.

The explanation for this novel effect of obtaining the agglomeration of such fine compositions of a mineral mixture with a high clay content without the need for binders, additives, deflocculants, etc., must be sought in the crystal-chemical properties thereof. Chemically speaking, clays are hydrated alumina silicates, the formula of which is: $Al_2O_3 \cdot 2SiO_2 \cdot H_2O$. Clays have structures similar to those of micas and form planar hexagonal sheets. Argillaceous minerals are characterized by two-dimensional sheets of corner sharing $SiO_4$ and $AlO_4$ tetrahedrons. The tetrahedral sheets are always bound to an octahedral sheet formed by small cations, such as aluminum or magnesium, coordinated by six oxygen atoms. The unshared vertex of the tetrahedral sheet also forms part of one side of the octahedral sheet but an additional oxygen atom is located above in the tetrahedral sheet at the center of the sixth tetrahedron. That oxygen atom binds to the hydrogen atom forming an OH group in the argillaceous structure. Depending on the composition of the tetrahedral and octahedral sheets, the layer may or may not have a residual electrical charge or a negative net charge. If the layers are charged, that charge is balanced out by the cations located between the layers, such as $Na^+$ or $K^+$. These structures have a strong capacity to absorb the water molecules on the punctual sites of positive or negative charge (crystallization water) and an additional water corresponding to water molecules that are within the pores existing in the granules thereof (physically absorbed water). Clays are characterized by acquiring plasticity when mixed with an optimal amount of water. There are even expansive clays that can undergo great changes in volume in direct relation to the changes in the water content absorbed within the layers thereof.

Therefore, this arrangement of clay sheets which can absorb water molecules and coordinate with the hydrogens and hydroxyls of the water molecules, together with the interaction between sheets of different micrograins, provide an explanation for the binding capacity of many clays. The present invention uses this physicochemical property of clays to achieve the agglomeration thereof by only adding a specific amount of water corresponding to the composition to be formulated according to the type of desired ceramic product. Other issues to be defined lie without a doubt in the rotational speed and the rate of movement (the residence time), suitable for the type of composition to be formulated in order to achieve the desired granule distribution.

It can be highlighted that in the method of the present invention there are four basic steps for forming the granules:

Metering the powder of the composition, or eventually metering the components thereof, together with metering the necessary water in the form of droplets, both metering operations performed continuously at the intake of the device.

Mixing the powder and the water droplets during horizontal movement, during which the nucleation of tiny spheroidal material granules which gradually adhere to one another occurs.

Growing the spheroidal granules after the agglomeration of the mineral on the tiny grains formed takes place Approaching spherical shape as they get closer to the outlet of the device. In a certain way, this step is similar to that of a rotary vessel for granulation by agglomeration.

Adjusting Moisture Content and Drying

In-line drying of the granulates with an output moisture content of 10 to 14% is then performed on a continuous table cover by applying a stream of hot air with a temperature between 60-80° C. to eliminate the excess moisture content until a final moisture content of 6%. The granulated product is then passed through a sieve where the measurement of the granules is standardized, generally between 0.10-1.00 millimeters for most ceramic products. The percentage of granulated material obtained at the outlet is high, between 90-95%, the amount of powder of <0.100 mm is between 6.0-8.0% and the amount of material recirculated for recovery is relatively low, at most 10%.

Steps of Storing or Direct Compressing

The granulated material can then be stored to be subsequently sent for compression. Alternatively, the material can be sent directly for compression according to the desired ceramic products such as rustic flooring, ceramic covering, vitrified flooring or porcelain earthenware. The granulate has good quality, suitable mechanical strength and efficiently supports the subsequent operation and manipulation.

Therefore, in comparison with the method of atomization used today, the advantages of the method of granulation of the present invention can be summarized as:

In the present invention, the components of the composition can be mixed at the same time as their granulation after dry-phase grinding.

The plasticity of the wet-phase ground argillaceous composition is lost according to the type of clay since it is diluted excessively in water and must be granulated at high temperatures (about 650° C.), whereas with the method of granulation of the present invention, the plasticity is maintained because only a small amount of water is added and it is not affected by the drying temperature of about 60° C. As a result, less energy is used in pressing the granules produced according to the present invention since a force of about 10% less is applied.

According to the present invention, a 75-80% reduction in water consumption is obtained, since in atomization 30-40% is used on an amount of solid mass, whereas in the present invention, only 11-13% of water is used on the same dry mass to be granulated (the final moisture content of the granules in both systems is the same, of the order of 5-6%).

High energy consumption for evaporating the excess water is eliminated since the method of atomization is replaced with granulation according to the present invention.

Low fuel consumption in kilocalories per liter of evaporated water since the amount of water to be evaporated is of the order of 80% less. The method can use gas, electricity or another fuel source, according to whichever is the most economical or available in the area where the installation is located.

Complete cleaning of the evaporated water after the granulation according to the present invention, without fine powder, or binders, additives, deflocculants etc. The atomizer evaporates the water at temperatures of 650° C. together with the partially decomposed and transformed additives and fine particles of the minerals.

The environmental impact of the method of granulation according to the present invention is reduced for two reasons:

a) it only uses the strictly necessary amount of water for granulation, and b) it does not use binders, or additives, deflocculants etc.

The response time of the method of granulation of the invention necessary to change from the manufacture of one specific ceramic composition to another different composition is very short (about one hour). In the method of atomization, huge investments in reservoirs and mills are necessary for changing to new compositions, and the change requires extra time and cleaning, such as one day or more in the event of installations that are not duplicated. As an example, the atomizers which produce red compositions generally do not manufacture white atomized products.

The present method of granulation after dry-phase grinding of the invention constitutes a novel technology with zero pollution, since it does not pollute the water table and it consumes much less water than granulation by the method of atomization. For the same final production, the investment made in an installation is much more economical for the dry phase method than the wet phase method.

Now the object of the invention will be described based on a preferred embodiment given by way of a non-limiting example in which the invention will be better understood based on the following attached drawings.

BRIEF DESCRIPTION OF THE DRAWINGS

FIG. 5 (5.1 and 5.2) shows two microphotographs of the shape of the granulates of FIG. 4.

FIG. 6 (6.1 and 6.2) shows two microphotographs of the shape of the granulates of FIG. 4.

DESCRIPTION OF THE PREFERRED EMBODIMENT OF THE INVENTION

Figure 1:
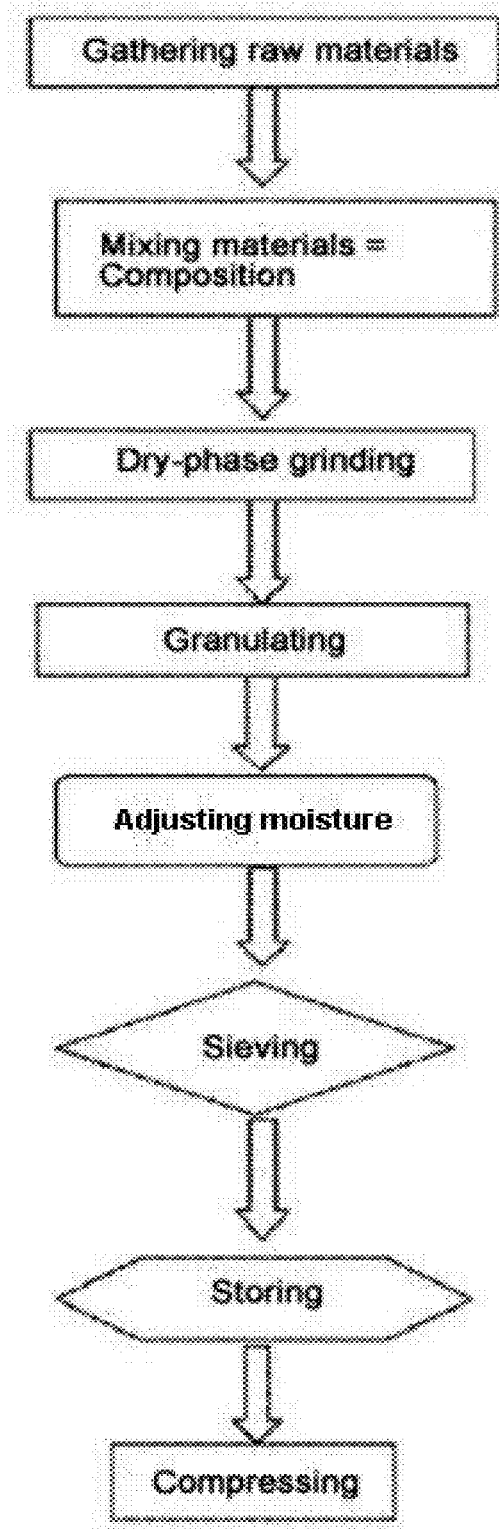
FIG. 1 shows a flow chart of the method of granulation by agglomeration after dry-phase grinding of the invention

The preferred embodiment was carried out according to the diagram of FIG. 1 through consecutive steps, in which a step of direct compression of the granulated ceramic composition is additionally included:
Gathering raw materials
Mixing materials=>Composition
Dry-phase grinding
Granulating
Adjusting moisture content
Sieving
Storing
Compressing
Observation: for the preferred embodiment, the components were mixed before granulation.

A mineral with 62% illite clays was mixed with another mineral with 30% silica sand content and the remaining content being potash feldspars. The components were mixed before grinding. The composition of the ceramic mixture at the end of the grinding had a particle size of less than 120 micrometers. Table 1 below shows the chemical analysis of the resulting composition.

| Element | Granulated composition |
|---------|------------------------|
| $SiO_2$ | 50.29 |
| $Al_2O_3$ | 25.37 |
| $Fe_2O_3$ | 2.51 |
| $Na_2O$ | 0.14 |
| $K_2O$ | 2.40 |
| CaO | 0.39 |
| $TiO_2$ | 0.96 |
| MgO | 0.39 |
| $ZrO_2$ | 0.03 |
| $P_2O_5$ | 0.05 |
| BaO | 0.045 |
| $SO_3$ | 0.36 |

A high $Al_2O_3$ content which should indirectly indicate a higher clay content and greater ease of granulation is observed in the composition. Of the cations present, the content of $K_2O$ is seen to be higher than the content of other cations which should indirectly indicate a higher feldspar content (not taking into account $Fe_2O_3$, the cation of which is rather heavy by itself, and is probably in the form of iron oxide impurities).

Figure 2:
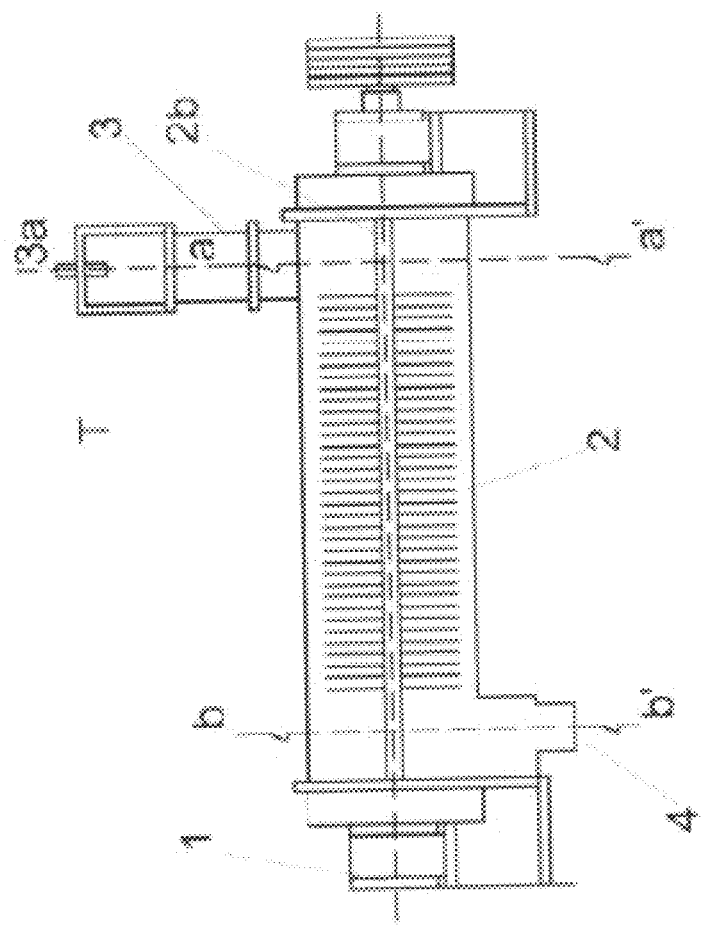
FIG. 2 shows a schematic side view of a granulator mixer used in the method of granulation by agglomeration after dry-phase grinding of the invention.
Figure 3:
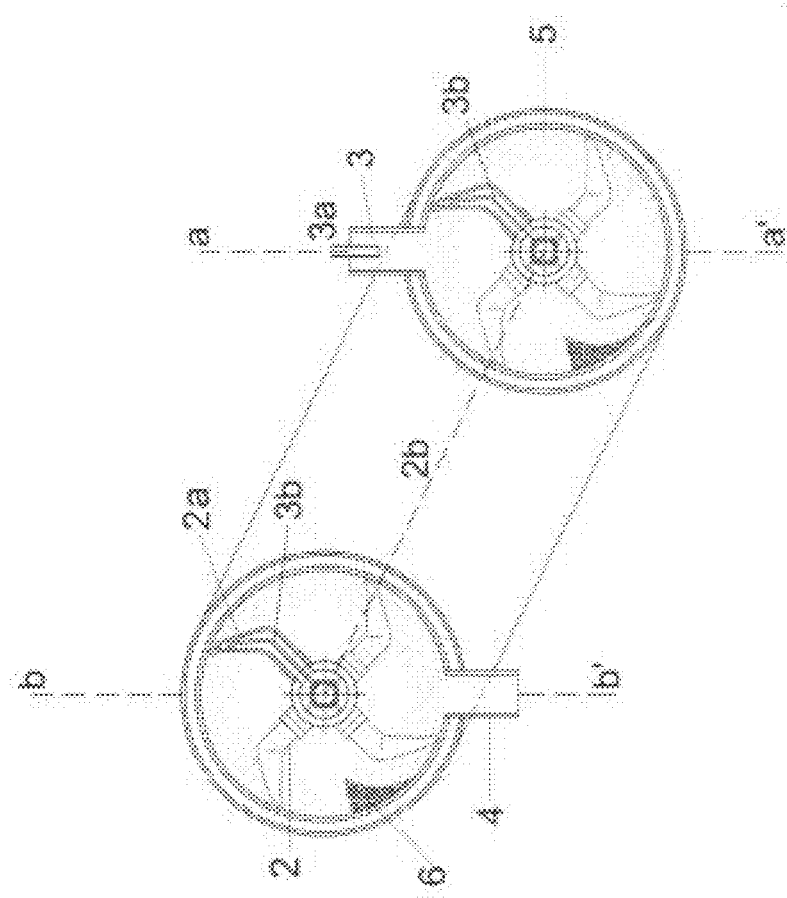
FIG. 3 shows a schematic front view of the granulator mixer and of the bars having ends in the form of drive paddles of the granulator mixer of FIG. 2.

FIG. 2 shows a schematic side view of the horizontally arranged device 1 for mixing-granulating by agglomeration, and provided with the bars 2. Said bars 2 (see FIG. 3) have ends in the form of paddles 2a, are assembled by cylindrical welding on the shaft 2b, and arranged at a 90° angle. They have a rather rectangular form of contact with the mixture.

The intake 3 of the powder of the ceramic composition and of the water into said device 1 takes place through the tubes 3a located within the cover (see FIG. 2) of the body of said device 1 in a first side end of the device 1; the intake of water is by means of a tube with a known flow rate. However water feeds through spray intake and another feed such as the water intake through the inside of the shaft, the water leaving through the tip of the paddles in order to contact the solid composition, these two being less common, can also be used. The water thus contacts the solid composition within the granulation machine, the two elements entering separately. It must be pointed out that the finer and more uniform the spraying of water, the more homogenous the particle size distribution will be, i.e., the closer the particle diameters will be to the average particle diameter. The ceramic composition is driven with the aid of the bars 2 and of their ends in the form of paddles 2a which, during the rotation of the device, move the mass of the ground mineral and the metered water along the entire length of said device 1 from the first end of the intakes thereof to an opposite second side end of the device 1. The output of the granulated material through said opposite second side end is by gravity through the outlet mouth 4, located in the lower part of the device. Therefore, the powder of any type of ceramic composition is fed by means of a belt, worm screw or any other system for feeding solids to the tubes 3a located within the cover (see FIG. 2) and for feeding the water introduced in the tubes, and they allow accurately knowing the amounts of tons/hour of both materials that are being introduced. Particularly, in the preferred embodiment a rotational speed of 1500 rpm was used and 20 tons/hour of ceramic composition were granulated.

The moisture content of the composition in the intake of said granulation device 1 was 0.6%. For agglomeration, an amount of water equivalent to 9% moisture content was continuously added into the fed mass, determining the latter as the optimal amount to be added to said composition of ceramic tiling during granulation. Said granulation is kept at temperatures between 20-50° C. The granulate at the outlet has a moisture content ranging between 10.5-11.0% and the temperature in the outlet (4) was of the order of 45-50° C.

The representative sample of the granulated ceramic composition had a particle size distribution shown below in Table 1. It must be highlighted that even for preparations having a smaller volume, initially made in a smaller granulation device with the same rotational speed of 1500 rpm and a capacity of only 400 kg/h−1, the grain size distribution of the product was very similar, indicating the influence of the rotational speed and the addition of the optimal amount of water on the final grain size distribution of the product.

TABLE 1

| Sieve (mm) | % of difference, weight | % accumulated below, weight | % accumulated above, weight |
|---|---|---|---|
| 1 | 6.00 | 94.00 | 6.00 |
| 0.6 | 18.50 | 75.50 | 24.50 |
| 0.5 | 8.50 | 67.00 | 33.00 |
| 0.4 | 10.70 | 56.30 | 43.70 |
| 0.3 | 13.70 | 42.60 | 57.40 |
| 0.2 | 16.80 | 25.80 | 74.20 |
| 0.1 | 19.00 | 6.80 | 93.20 |
| 0 | 6.80 | 0.00 | 100.00 |
| Total | 100.00 | | |

Figure 4:
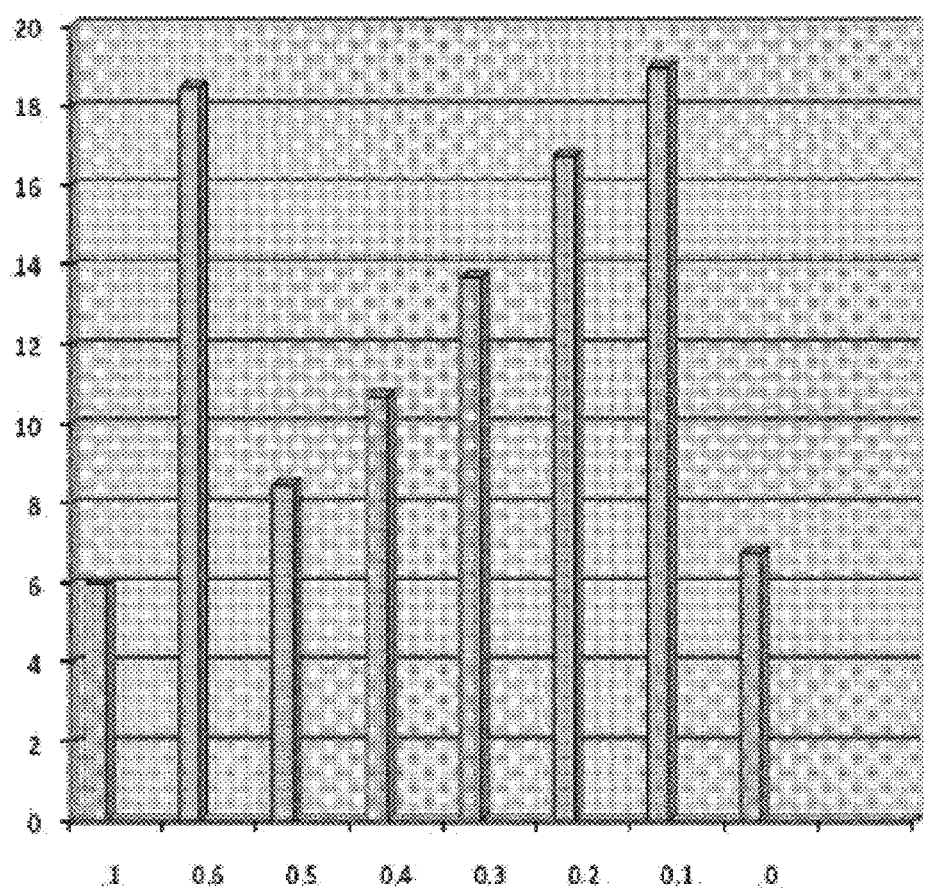
FIG. 4 shows a grain size distribution of an example of the product according to the invention expressed as % of mass vs. micrometers.

FIG. 4 shows this particle size distribution in a differential manner, i.e., particle size distribution is reflected as the relative amount of the fraction, in percentage by weight, which is retained in the sieves of each mesh opening (in mm). The analysis of this dependency has a bidisperse character since two maximum grain diameters are seen. One maximum grain diameter is found around 0.6 mm and the other is found in the region of 0.4-0.1 mm. This bidisperse grain size distribution can indicate a primary coarse grain formation phenomenon when water is added. A secondary small grain formation may occur next as a result of the fragmentation of the coarse grains when the mass is moved, and the nucleation of secondary grains thereon from the powder not linked at the beginning.

Information illustrating the morphology of the prepared granules is shown in FIGS. 5 (5.1 and 5.2) and 6 (6.1 and 6.2) showing the microphotographs obtained in a microscope with ×25 times magnification. Granules of different shapes and sizes are seen, where the shape is almost spheroidal and the differences in size are consistent with the results of larger, smaller and fine grains obtained by granulation using sieves.

The dry mechanical strength of the samples provided the following results:

Pressed moisture content of the granulated product: 6%. Pressure exerted on the sample: 280 Kg/cm$^2$ (determined by hydraulic press). Dry mechanical strength: 40 Kg/cm$^2$. Mechanical strength of the pieces after cooking: 620 Kg/cm$^2$.

Therefore, the mechanical strength of the granulated particles of the present embodiment was very satisfactory and, they behaved in a manner identical to that of the commercial products obtained by the method of drying by atomization during the handling thereof in transport, manipulation and mold filling. The practical importance of the present invention is that the morphology of the granulate in terms of grain size or shape does not change throughout the entire method of packaging, bulk transport, normal manipulation and mold filling.

In summary, the crucial technological conclusion is that the product of the present granulation has grain diameters almost entirely between 1.0 and 0.1 mm, which suitably correspond with the industrial requirements imposed for manipulating the ceramic composition since the amount of powder (less than 0.1 mm) is less than 7%, whereas the requirements accepted today for manipulating ceramic granulates allow a fine content of up to 14%. Therefore, it must be pointed out that the characteristics of the granulate were not different from those of the granulated product marketed today and produced by atomizing the wet-phase ground composition, being even better than some of such products. Additionally, from the profitability viewpoint only 6% of coarse grains, grains more than 1 mm, are obtained. It should be noted that the coarse grains (more than 1 mm) are recycled in the method and ground again. Commercial granulates with granules more than 1 mm are useless for customers. This percentage is also very satisfactory since a method of granulation with a 94% profitability of the product fed to the device is obtained.

As a result, a method of granulation after dry-phase grinding with granulates having properties equivalent to the granulates obtained in the industry of ceramic materials through the method of wet-phase grinding and the subsequent suspension atomization, has been developed.

In comparison with the method of granulation by atomization used today in the industry of ceramic materials, the advantages obtained by the method of granulation of the present invention can be summarized as:

High energy savings of 80%, due to the reduction in water consumption of 75-80% during granulation and the reduction of 10-20% in the subsequent pressing of the granules produced according to the invention.

The response time of the invention for changing the manufacturing of one type of specific composition to another type of ceramic composition is very short, about one hour, whereas the response time of the method of atomization is very long, taking up several days.

For the same final production, the investment made on the granulation installation according to the method of the invention for ground products obtained by dry-phase grinding is much more economical than the method of granulation by atomization of the ground product obtained by wet-phase grinding.

The present method of granulation of the invention constitutes a novel environmental technology with zero pollution, since it does not pollute the water table and air and its water consumption is much lower.

Having sufficiently described the invention as well as a preferred embodiment thereof as a non-limiting example, it merely remains to be added that its constitution and the materials used can be modified without departing from the scope of the invention defined in the following claims.

The invention claimed is:

1. A method of granulation by agglomeration of argillaceous ceramic compositions ground in dry phase, comprising the steps of:
    introducing, at room temperature, a ceramic composition of powdery components in dry phase with grain sizes of less than 120 micrometers, obtained from ground argillaceous minerals and inorganic material, in a horizontally arranged cylindrical device through a first end, the composition content being up to 60% of argillaceous mineral components with respect to the total introduced;
    introducing a specific amount of water without binders or additives in the cylindrical device, the specific amount of water determined based on the introduced ceramic composition and on the granulation to be obtained;
    continuously granulating said ceramic composition of powdery components non-stop inside the cylindrical device by moving said components for the formation of granules from said first end to a second end due to the rotating action of a central shaft with perpendicular bars provided with paddles at the ends thereof, the rotational speed of the shaft being between 500 and 3,000 rpm, maintaining the rotational speed and the amount of water constant when granulating the ceramic composition of powdery components, the rotational speed determined based on the introduced ceramic composition and on the granulation to be obtained; and
    extracting the granulated material from the cylindrical device through said second end.

2. The method according to claim 1, wherein a moisture content of the powdery components when introduced in the cylindrical device is between 0.5% and 2.5% by weight.

3. The method according to claim 1, wherein a moisture content of the granulated material at the outlet of the cylindrical device is between 8 and 15% by weight depending on the ceramic composition introduced in the cylindrical device.

4. The method according to claim 3, wherein the granulated material is subjected to a step of continuous in-line drying to reduce the moisture content to 6%-7% by weight at a suitable temperature depending on the amount of water to be dried, and on the time and the space available.

5. The method according to claim 4, wherein the drying temperature is between 40° C. and 90° C.

6. The method according to claim 1, wherein the introduced amount of water is between 11% and 13% by weight of the dry mass to be granulated.

7. The method according to claim 1, wherein the ceramic composition of argillaceous minerals and inorganic material is obtained by mixing the argillaceous minerals and inorganic material, said mixing performed before grinding the argillaceous minerals and inorganic material, when grinding the argillaceous minerals and inorganic material, after grinding the argillaceous minerals and inorganic material, or during granulation in the cylindrical device.

8. The method according to claim 1, wherein the argillaceous minerals are selected from illite clays, kaolinite clays and/or fireclays, or mixtures thereof; and the inorganic materials are selected from silica sand, feldspathic sand, soda feldspars, potash feldspars, lithium feldspars, pegmatite, magnetite, calcium carbonate, magnesium carbonate, or mixtures thereof.

9. The method according to claim 1, wherein the step of granulating is performed at a temperature between 30° C. and 50° C.

10. The method according to claim 4, wherein after drying, the granulated material is subjected to standardization depending on the measurement of granules by sieving, where:
   between 90 and 95% of the granulated material has a measurement between 0.1 and 1 mm,
   between 6 and 8% of the granulated material has a measurement of less than 0.1 mm, this being considered as powder which is recirculated to return to the step of granulating, and
   between 0 and 10% of the granulated material has a measurement of more than 1 mm, and is recirculated for recovery, being ground again.

11. The method according to claim 1, wherein the water is introduced through a water intake located in the intake of the powdery material.

12. The method according to claim 1, wherein the water is introduced through a water intake located inside the central shaft communicating with tips of the paddles.

13. The method according to claim 1, wherein the water is introduced by spraying.

14. A method of granulation by agglomeration of argillaceous ceramic compositions ground in dry phase, comprising the steps of:
   continuously introducing a ceramic composition of powdery components in dry phase with grain sizes of less than 120 micrometers, obtained from ground argillaceous minerals and inorganic material, in a cylindrical device through a first end, the composition content being up to 60% of argillaceous mineral components with respect to the total introduced;
   continuously introducing a specific amount of water without binders or additives in the cylindrical device, the specific amount of water determined based on the introduced ceramic composition and on the granulation to be obtained;
   continuously granulating the ceramic composition of powdery components inside the cylindrical device by moving the components for the formation of granules from the first end to a second end due to the rotating action of a central shaft with paddles, the rotational speed of the shaft being between 500 and 3,000 rpm, maintaining the rotational speed and the amount of water constant when granulating the ceramic composition of powdery components, the rotational speed determined based on the introduced ceramic composition and on the granulation to be obtained; and
   extracting the granulated material from the cylindrical device through the second end.

* * * * *